(12) United States Patent
Bartos et al.

(10) Patent No.: US 8,181,454 B2
(45) Date of Patent: May 22, 2012

(54) ENHANCED PRESSURE BALANCING OF AN OIL PUMP ROTOR FOR AN AUTOMATIC TRANSMISSION

(75) Inventors: Andrew L. Bartos, Clarkston, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 886 days.

(21) Appl. No.: 12/247,345

(22) Filed: Oct. 8, 2008

(65) Prior Publication Data

US 2010/0084237 A1 Apr. 8, 2010

(51) Int. Cl.
*F16D 33/18* (2006.01)

(52) U.S. Cl. .................................................. 60/358

(58) Field of Classification Search ...................... 60/358
See application file for complete search history.

(56) References Cited

U.S. PATENT DOCUMENTS 2,999,361 A * 9/1961 Zierick ........................ 60/358
6,357,228 B1 * 3/2002 Botosan et al. ............... 60/358

* cited by examiner

*Primary Examiner* — Daniel Lopez
(74) *Attorney, Agent, or Firm* — Quinn Law Group, PLLC

(57) ABSTRACT

A transmission includes a torque converter and an oil pump for providing fluid. The transmission has a stator shaft and a torque converter hub mounted on the stator shaft, defining an annular chamber between the stator shaft and the torque converter hub. A pump rotor for the oil pump is mounted on the torque converter hub. The torque converter hub extends beyond the pump rotor to fluidly seal the pump rotor from the annular chamber between the torque converter hub and the stator shaft.

8 Claims, 3 Drawing Sheets

ENHANCED PRESSURE BALANCING OF AN OIL PUMP ROTOR FOR AN AUTOMATIC TRANSMISSION

TECHNICAL FIELD

The present invention relates, generally, to a transmission having a torque converter and oil pump, and more specifically, to the arrangement of the oil pump relative to the torque converter.

BACKGROUND OF THE INVENTION

Automotive vehicles are commonly equipped with a torque converter located between a vehicle engine and an automatic transmission to transmit torque. The torque converter transmits torque via fluid provided by a transmission oil pump.

A rotor for the oil pump is typically mounted on a torque converter hub. Commonly, fluid pumping losses across the pump rotor occur due to operating clearances on mating parts and manufacturing tolerances. Fluid typically leaks across the pump rotor from a high pressure cavity outside the pump rotor to a low pressure area near the torque converter hub. The low pressure area near the torque converter hub, however, is part of the apply passage for the torque converter clutch. Thus, fluid leakage across the pump rotor is increased when a torque converter clutch is in a disengaged position and the pressure differential across the pump rotor face is higher.

SUMMARY OF THE INVENTION

An oil pump for a vehicle transmission that can provide decreased leakage across a pump rotor is desired. A vehicle includes a transmission having a torque converter and an oil pump for providing fluid. The transmission has a stator shaft and a torque converter hub mounted on the stator shaft and defining an annular chamber therebetween. A pump rotor for the oil pump is mounted on the torque converter hub. The torque converter hub extends beyond the pump rotor to fluidly isolate the low pressure area near the center of the pump rotor from the annular chamber between the torque converter hub and the stator shaft.

There is at least one hub alignment feature located on the torque converter hub and at least one rotor alignment feature located on the pump rotor. The at least one hub alignment feature and the at least one rotor alignment feature correspond to one another to maintain rotational alignment and transmit torque between the torque converter hub and pump rotor.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
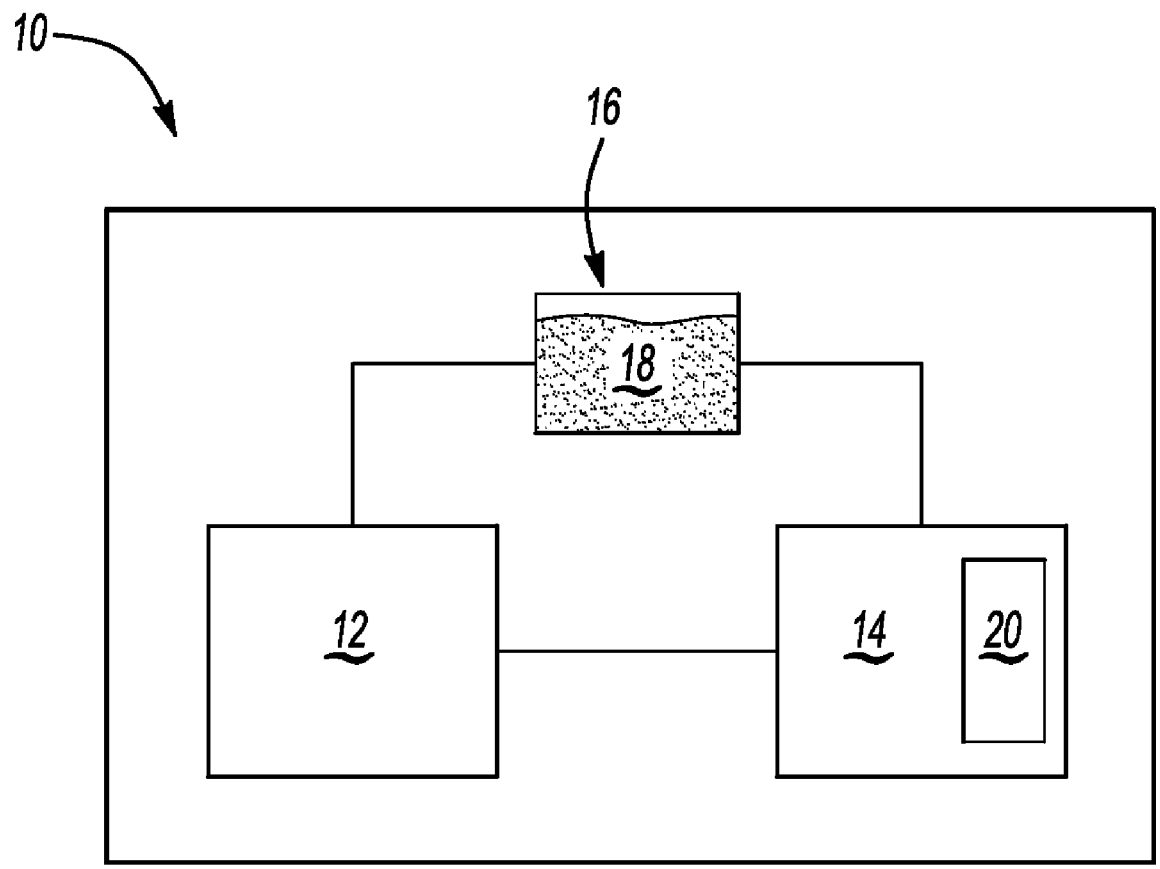
FIG. 1 is a schematic depiction of a transmission having a torque converter and an oil pump within an automotive vehicle.

Referring to the Figures, wherein like reference numbers refer to the same or similar components throughout the several views, FIG. 1 schematically illustrates an automotive vehicle 10 having a transmission 12 and a torque converter 14. A transmission oil pump 16 provides pressure to move fluid 18, typically oil, through the transmission 12 and the torque converter 14. In addition to lubricating and cooling the transmission 12, the fluid 18 is used to engage and disengage a torque converter clutch 20 at a predetermined speed as is known in the art.

Figure 2:
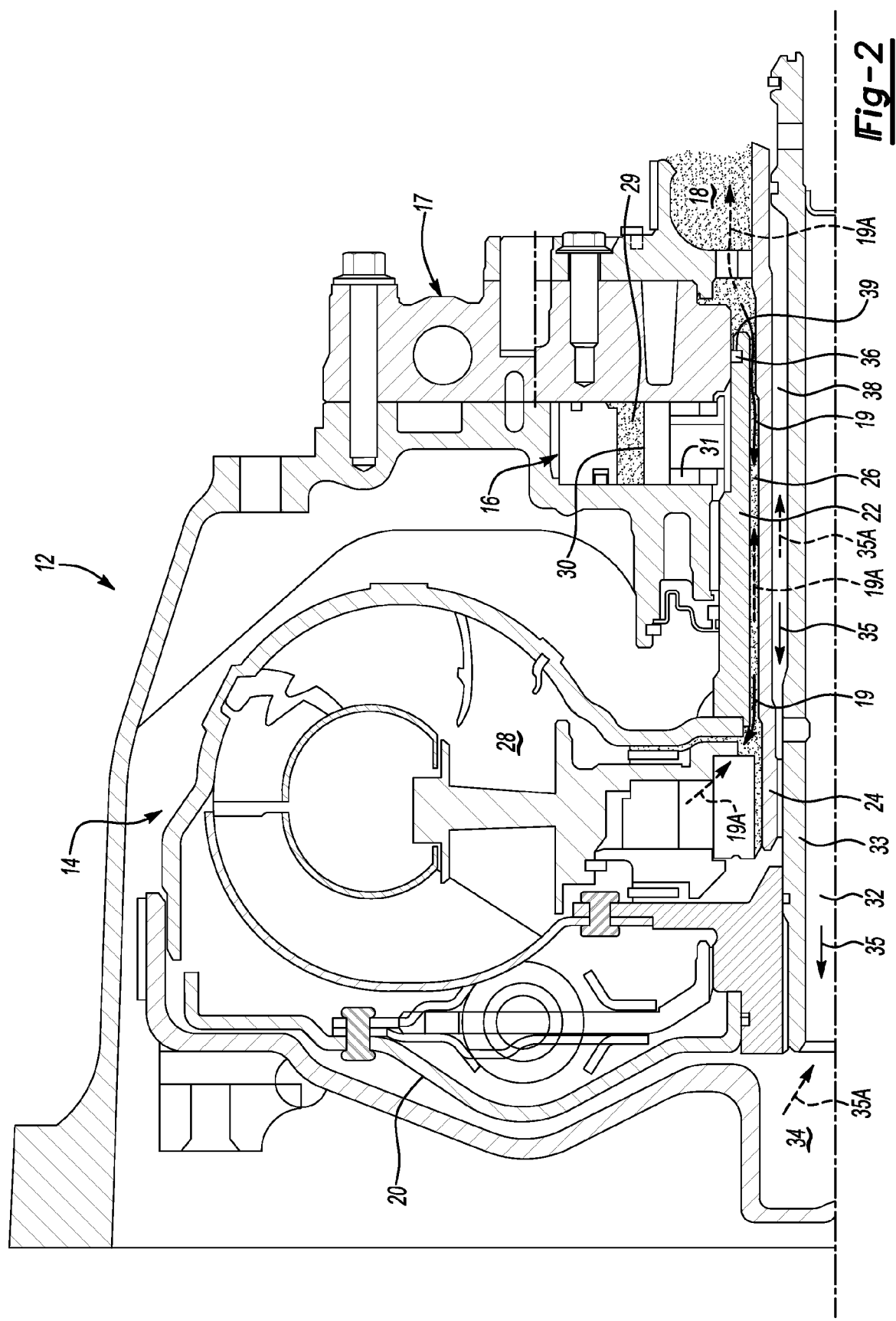
FIG. 2 is a schematic cross-sectional view of the transmission having the torque converter and the oil pump of FIG. 1.

FIG. 2 is a schematic cross-sectional view of the transmission 12 and the torque converter 14. The torque converter 14 includes a torque converter pump hub 22. A transmission pump rotor 30 is connected to and driven by the torque converter pump hub 22. A stator shaft 24 is located within the torque converter 14 to support a torque converter stator assembly (not numbered). The torque converter pump hub 22 is concentric to the stator shaft 24. An annular chamber 26 is defined by the torque converter pump hub 22 and the stator shaft 24. The annular chamber 26 allows the fluid 18 to pass into a torque converter cavity 28. The annular chamber 26 is commonly known as a torque converter apply passage.

In addition, fluid 18 is located in a pump rotor cavity 29 in the pump 16 on an opposing side of the pump rotor 30. Therefore, the fluid 18 acts on opposing faces of the pump rotor 30.

Further, the fluid 18 also passes through a shaft passage 32 defined by and located within a transmission input shaft 33 and a connecting annular chamber 38 defined by the stator shaft 24 and the transmission input shaft 33. This flow path is commonly known as the torque converter release passage. Fluid exits the shaft passage 32 as indicated by arrows 35 and enters a cavity 34 defined by the torque converter 14. The fluid 18 within the cavity 34 applies pressure to a first side of the torque converter clutch 20 to disengage the torque converter clutch 20. Fluid 18 exits the torque converter cavity 28 through the annular chamber 26, as indicated by arrows 19A, shown in phantom. The pressure differential between the pump rotor cavity 29 and the annular chamber 26 is high.

To engage the torque converter clutch 20, the direction of fluid flow in the apply and release passages is reversed. That is, the fluid 18 flows into the torque converter cavity 28 through the annular chamber 26, indicated by arrows 19 and exits the torque converter 14 through the shaft passage 32 as indicated by arrows 35A. The fluid 18 within the cavity 28 applies pressure to a second side of the torque converter clutch 20 to engage the torque converter clutch 20. The pressure differential between the pump rotor cavity 29 and the annular chamber 26 is now lower.

However, the torque converter pump hub 22 extends past the pump rotor 30. The torque converter pump hub 22 fluidly isolates the low pressure area 31 near the center of the pump rotor 30 from the annular chamber 26 to prevent fluid pressure changes in the apply chamber 26 from being experienced by the low pressure area 31. Additionally, an oil seal 36 is mounted on the torque converter pump hub 22 behind the pump rotor 30. That is, the oil seal 36 is mounted on the torque converter pump hub 22 between the torque converter pump hub 22 and the pump cover 17. The oil seal 36 is preferably located in a groove 39 formed in the torque converter hub 22. The torque converter pump hub 22 thus forms a seal with the pump cover 17 adjacent to the oil seal 36. Therefore, pressure changes in the apply chamber 26, resulting from the apply and release of the torque converter clutch 20, do not affect the operating efficiency of the pump 16.

Figure 3:
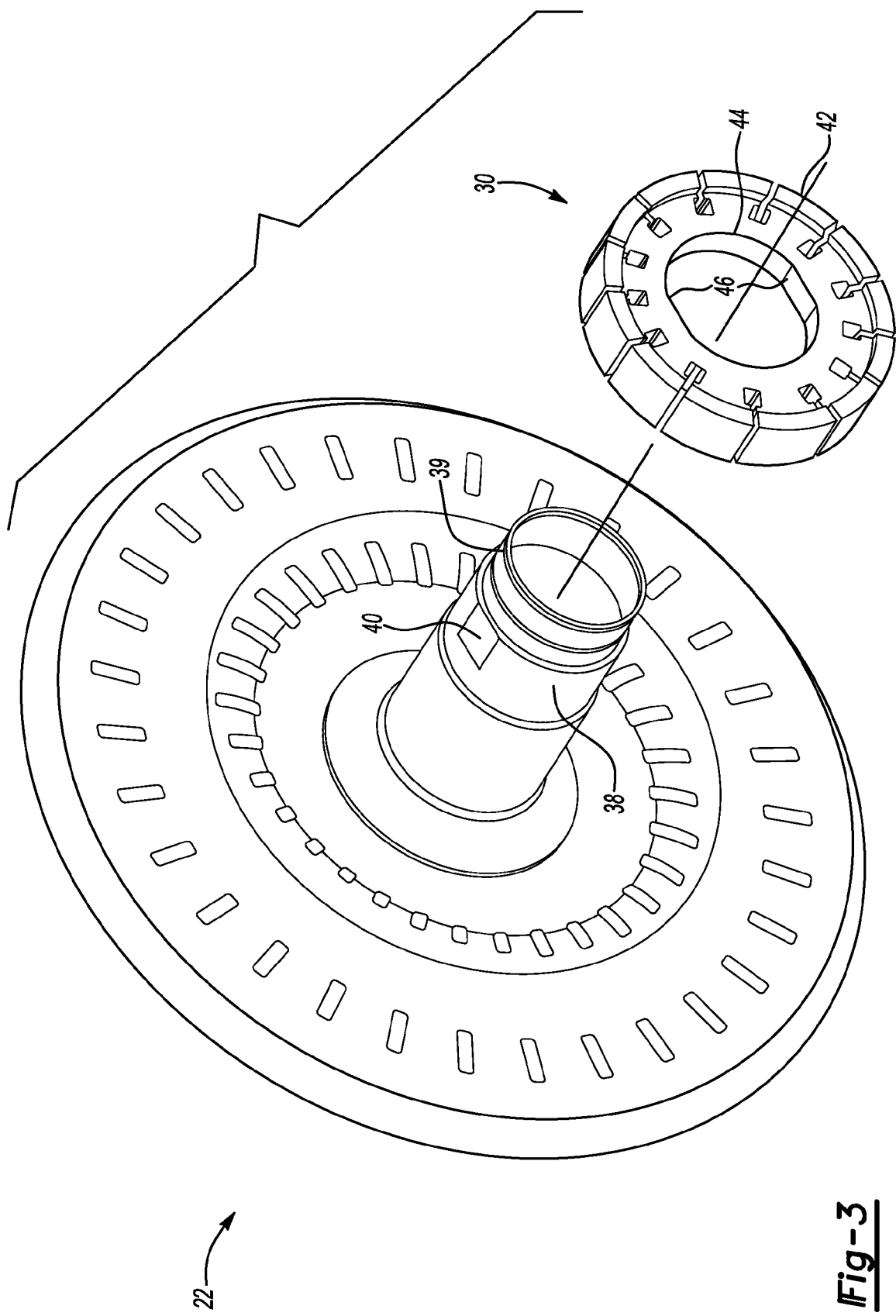
FIG. 3 is a schematic exploded perspective view of the torque converter and a pump rotor of FIGS. 1 and 2.

FIG. 3 shows an exploded schematic view of the torque converter pump hub 22 and the pump rotor 30. The torque converter pump hub 22 has a generally circular outer diameter 38. At least one hub alignment feature 40 is located on the torque converter pump hub 22. In the embodiment shown, the hub alignment features 40 are two surfaces on opposing sides of the outer diameter 38. The pump rotor 30 has a rotor outer diameter 42 and an inner diameter 44. The pump rotor 30 defines at least one rotor alignment feature 46 on the inner diameter 44. In the embodiment shown the rotor alignment features 46 are two surfaces located on opposing sides of the inner diameter of the pump rotor 30.

The rotor alignment feature 46 is rotationally aligned with the hub alignment feature 40 when the pump rotor 30 is mounted on the torque converter pump hub 22. The hub alignment feature 40 and the rotor alignment feature 46 maintain the torque converter pump hub 22 and pump rotor 30 in rotational alignment with one another during operation. That is, the hub alignment feature 40 and the rotor alignment feature 46 engage one another such that, the pump rotor 30 and the torque converter pump hub 22 rotate together. More or fewer alignment features 40 and 46 may be defined by the torque converter pump hub 22 and the pump rotor 30 and may take different shapes, as desired. For example, the alignment features 40 and 46 may be mating splines. It is only necessary that the shape and position of the hub alignment features 40 correspond to the shape and position of the rotor alignment features 46 and prevent relative rotational movement once assembled Referring to FIGS. 2 and 3, the hub alignment features 40 are flattened portions on the outer diameter 38 of the torque converter pump hub 22 and do not extend all the way through the torque converter pump hub 22. Thus, fluid 18 is prevented from leaking from the low pressure area 31 near the center of the pump rotor 30 to the annular chamber 26. Additionally, the oil seal 36 is located between the torque converter pump hub 22 and the pump cover 17 to minimize pressure fluctuations to the low pressure area 31. The oil seal 36 is located in the groove 39 defined by the torque converter hub 22.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an oil pump for providing fluid, wherein the oil pump includes a pump rotor and a pump cover;
a stator shaft; and
a torque converter having a torque converter hub concentric with the stator shaft and defining an annular chamber therebetween;
wherein the pump rotor is connected to and driven by the torque converter hub, and wherein the torque converter hub extends from the torque converter to beyond the pump rotor and into sealing engagement with the pump cover to fluidly seal the pump rotor from the annular chamber.

2. The transmission of claim 1, wherein the torque converter hub defines an outer diameter having at least one hub alignment feature located thereon, wherein the pump rotor defines an inner diameter having at least one rotor alignment feature located thereon, wherein the at least one hub alignment feature and the at least one rotor alignment feature correspond to one another to maintain rotational alignment and transmit torque between the torque converter hub and pump rotor.

3. The transmission of claim 2, wherein the at least one hub alignment feature is a flat surface on the outer diameter of the torque converter hub, and wherein the at least one rotor alignment feature is a flat surface on the inner diameter of the pump rotor.

4. The transmission of claim 1, further comprising a seal mounted between the torque converter hub and the pump cover to prevent fluid leakage between the oil pump and the annular chamber.

5. A transmission comprising:
an oil pump, wherein the oil pump includes a pump rotor and a pump cover;
a stator shaft;
a torque converter having a torque converter hub concentric with the stator shaft and cooperating with the stator shaft to define an annular chamber therebetween, wherein the pump rotor is mounted on the torque converter hub;
at least one hub alignment feature located on the torque converter hub;
at least one rotor alignment feature located on the pump rotor, wherein the at least one hub alignment feature and the at least one rotor alignment feature correspond to one another to maintain rotational alignment between the torque converter hub and pump rotor
wherein the torque converter hub extends from the torque converter to beyond the pump rotor and into engagement with the pump cover; and
a fluid seal mounted between the torque converter hub and the pump cover to fluidly seal a low pressure area of the pump from the annular chamber to prevent fluid leakage therebetween.

6. The transmission of claim 5, wherein the at least one hub alignment feature is a flat surface on an outer diameter of the torque converter hub and wherein the at least one rotor alignment feature is a flat surface on an inner diameter of the pump rotor.

7. The transmission of claim 5, wherein the at least one hub alignment feature does not extend through the torque converter hub.

8. The transmission of claim 5, wherein a groove is formed in the torque converter hub and the fluid seal is mounted within the groove.

* * * * *